July 10, 1956  H. T. WHITE  2,753,806
MOTOR DRIVEN PUMPS
Filed Nov. 12, 1952

INVENTOR.
HOWARD T. WHITE
BY
*B. T. Wobensmith*
ATTORNEY.

United States Patent Office 2,753,806
Patented July 10, 1956

2,753,806

MOTOR DRIVEN PUMPS

Howard T. White, Melrose Park, Pa., assignor of one-half to David P. Litzenberg, Montgomery County, Pa.

Application November 12, 1952, Serial No. 319,819

14 Claims. (Cl. 103—87)

This invention relates to motor driven pumps.

It is the principal object of the present invention to provide a motor driven pump in which the parts exposed to the pumped liquid can be easily constructed from materials resistant to the pumped liquid.

It is a further object of the present invention to provide a motor driven pump having an improved path for and control of the flow of the pumped liquid.

It is a further object of the present invention to provide a motor driven pump having an improved character of self lubrication.

It is a further object of the present invention to provide a motor driven pump with an isolating sleeve interposed between the motor stator and motor rotor and in which the sleeve is utilized for obtaining alignment of the rotating parts.

It is a further object of the present invention to provide a motor driven pump which can be readily isolated, both as to noise and electrolytic action, from the remainder of the pumping circuit.

Other objects and advantageous features of the invention will be apparent from the specification and claims.

Figure 1:
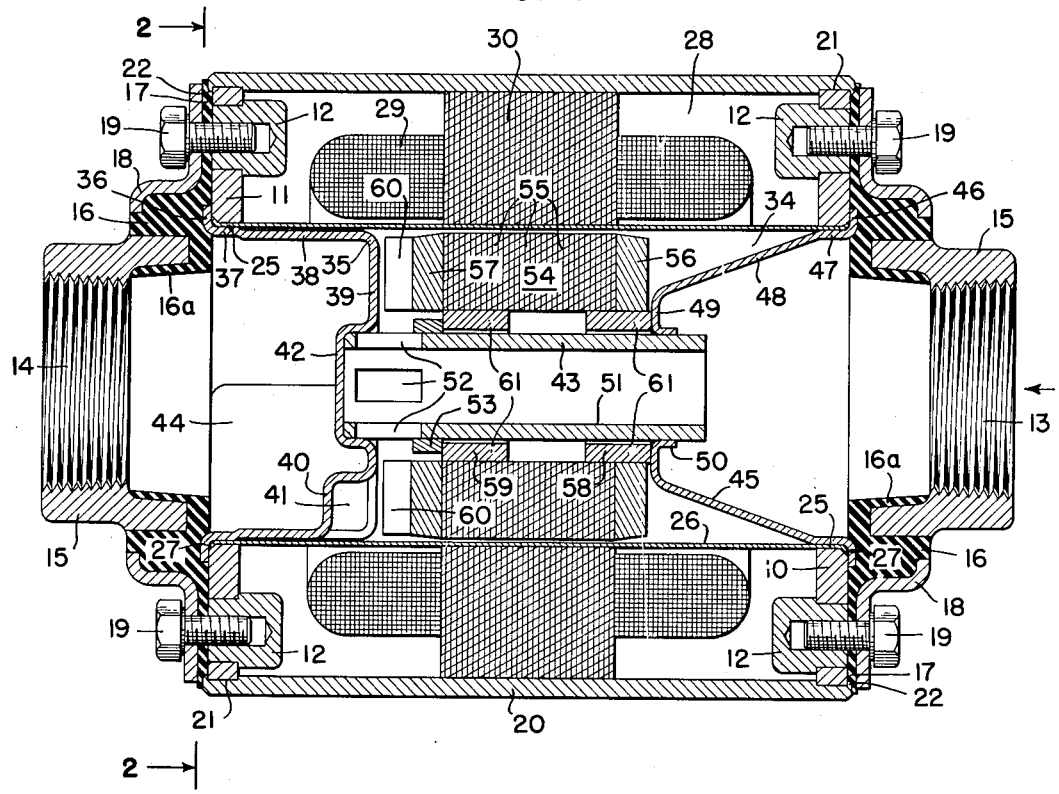
Figure 2:
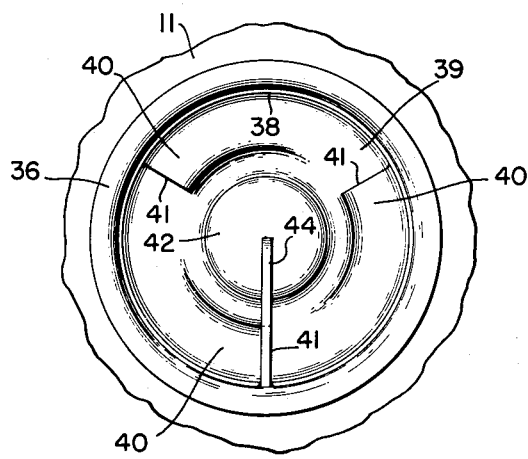

The nature and characteristic features of the invention will be more readily understood from the following description, taken in connection with the accompanying drawings forming part thereof, in which;

Figure 1 is a longitudinal sectional view through a motor driven pump in accordance with the invention; and Fig. 2 is a transverse sectional view taken approximately on the line 2—2 of Fig. 1.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, in which a preferred embodiment of the invention is illustrated, a pair of end frame plates 10 and 11 are provided having inwardly extending bosses 12 mounted therein at a plurality of locations. Inlet and outlet connections 13 and 14 are provided each having a central internally threaded connecting sleeve 15 with an isolating ring 16. The rings 16 may be of any desired insulating material of resilient type, rubber, natural or synthetic, being preferred, and neoprene being particularly suitable. The rings 16 are preferably permanently secured to the sleeves 15 in any desired manner, such as by vulcanization. The rings 16 may each have an inner sleeve section 16a, engaged with interior portions of the sleeves 15, and preferably each has an outwardly extending flange 17 formed thereon. A clamping ring 18 is provided for each of the rings 16 and may, if desired, be permanently secured thereto in any desired manner, such as by vulcanization.

The inlet and outlet connections 13 and 14 are preferably held in assembled and in fluid tight relation to the respective end frame plates 10 and 11 by studs 19 which engage in blind or closed end holes in the bosses 12.

Extending between the outer edges of the end frame plates 10 and 11, a cylindrical cover 20 is provided having end grooves 21 for spacing the end frame plates 10 and 11 at the desired axial locations. The cover 20 preferably has the ends thereof peaned over, as at 22, in overlapping relation to the plates 10 and 11, to provide fluid tight joints at these locations.

The end frame plates 10 and 11 are also preferably each provided with central cylindrical openings 25 and extending therebetween a cylindrical sleeve 26, of nonmagnetic responsive material, is provided. The sleeve 26 may have outwardly flared ends 27 fitting into complemental portions in the plate openings 25 for preventing axial displacement. While the sleeve 26 may be of any suitable material it is preferred that it be of stainless steel.

A motor stator chamber 28 is thus provided in the space between the end plates 10 and 11, within the cover 20 and outside the sleeve 26 within which motor stator windings 29 and laminated field pieces 30 may be disposed. The windings 29 may be activated from any suitable source of alternating current supplied by conductors (not shown).

A cup shaped supporting bracket 35 which may be made as a metal stamping, and preferably of stainless steel, is provided, at the outlet end of the motor pump, and preferably has an end rim 36 which is adapted to overlie a portion of the outer face of the ring 11 beyond the central opening 25, a short cylindrical section 37 engaging the sleeve 26 with a press fit, a longer cylindrical section 38 in closely spaced but separated relation to the sleeve 26 and a transverse end wall 39.

It will be noted that the ring 16 is in engagement with the rim 36 to prevent fluid leakage at this location.

The end wall 39 is shaped to provide, at a plurality of locations, passageways 40 which increase in size axially and have discharge openings 41 in radial planes through the central longitudinal axis of the space within the sleeve 26. On the exterior of the end wall 39, and radially disposed, a baffle wall 44 is welded or otherwise secured for aiding in retarding the rotary movement of the fluid discharged from the openings 41.

The end wall 39 is also provided, at the center thereof, with a closed end cylindrical axially disposed offset 42 for the reception of the outlet end of a hollow cylindrical axially and centrally disposed support 43, preferably of stainless steel.

A supporting cup shaped bracket 45, which may be made as a metal stamping, and preferably of stainless steel, is also provided, at the inlet end of the motor pump, and preferably has an end rim 46 which is adapted to overlie a portion of the outer face of the ring 10 beyond the central opening 25, a short cylindrical section 47 engaging the sleeve 26 with a press fit, a frusto conical section 48, an end wall 49, and an axially outwardly extending cylindrical rim 50.

The rim 50 supports the inlet end of the cylindrical support 43. The axial length of the rim 50 is not in excess of and is preferably less than the thickness of the end plate 11.

A rotor chamber 34 is thus provided between the brackets 35 and 45, within the sleeve 26 and outside the support 43.

The support 43 has a central interior axially extending bore 51 therethrough communicating at one end with the interior of the bracket 45 and closed at the other end by the end portion of the offset 42. The support 43 has a plurality of radially extending fluid delivery openings 52 therethrough at the same axial locations, the total cross sectional area of the openings 52 being substantially the same as the cross sectional area of the bore 51.

The support 43, on the exterior thereof, has a thrust ring 53 shrunk thereon or otherwise secured thereto prior to assembly, the thrust ring 53 being close to the delivery openings 52.

The motor rotor 54 is mounted within the rotor chamber 34 and is preferably of the short circuited type with laminations 55 and rotor end plates 56 and 57. The motor rotor 54 is preferably mounted in the axial space between the thrust ring 53 and the end wall 49 on spaced bearing rings 58 and 59, the thrust on the bearing ring 59, this being the greater thrust, being exerted against the thrust ring 53 and the thrust on the bearing ring 58, this being the lesser thrust, being exerted on the end wall 49. The rings 58 and 59 preferably have grooves 61 extending along their interior faces for lubricating fluid flow.

The rotor end plate 57 is preferably provided with impeller vanes or blades 60 having their inner ends facing towards the delivery openings 52 and their outer radial portions facing the passageways 40.

The mode of operation will now be summarized briefly.

Upon energization of the windings 29 and the setting up of the appropriate field in the field laminations 30, the motor rotor 54 is rotated, the magnetic circuit being effective through the sleeve 26 which is disposed in the cylindrical gap between the stator laminations 30 and the rotor laminations 55.

Upon rotation of the motor rotor 54, fluid entering through the inlet connection 13 passes through the cup bracket 45, the bore 51, the openings 52 and to the vanes 60 carried by the end plate 57. The fluid, impelled by the vanes 60, is delivered to the passageways 40 and through the openings 41 to the space within the cup bracket 35. The wall 39 with its passageways 40 and openings 41 and its outer baffle wall 44 functions as a diffuser. The fluid passes from the space within the cup bracket 35 to the outlet connection 14 for delivery.

A small portion of the fluid being pumped may pass to the space between the wall of the section 48 and the end plate 56 from which it passes through the grooves 61 towards the inner ends of the impeller vanes 60.

It will be noted that the motor stator chamber 28 is completely isolated and protected against fluid leakage by the engagement of the cover 20 with the end plates 10 and 11, the provision of the sleeve 26 and the engagement of the rings 16 over the end flanges 36 and 46 and the fluid tight engagement of the cylindrical portions 37 and 47 with the sleeve 26. The rims 17, also, engage the intersections of the cover 20 with the end plates 10 and 11 and the intersections of the bosses 12 with the end plates 10 and 11. If desired, the motor pump herein described can accordingly be used as a liquid submerged unit.

It will also be noted that, between the fluid inlet connection 13 and the fluid outlet connection 14, the fluid being pumped is completely isolated from the stator chamber 28 and from the exterior.

The resilient and insulating rings 16 and their flanges 17 prevent the transfer of any motor noise or vibration to the sleeves 15 and therebeyond and at the same time prevent any electrolytic action which might be effective in the pumped fluid circuit outside the sleeves 15 from affecting the metallic parts within the pump and with which the pumped fluid is in contact.

I claim:

1. A motor driven pump comprising housing members having an interior cylindrical sleeve member extending therebetween to provide exteriorly of said sleeve a motor stator chamber, supporting members extending inwardly from opposite ends of said sleeve member, a hollow cylindrical member fixedly carried by said supporting members, said cylindrical member having a longitudinal interior passageway open at one end to provide a fluid inlet, said cylindrical member having a plurality of openings through the wall thereof for fluid delivery, said sleeve member having a fluid delivery passageway therein, and a rotor member mounted on the exterior of said cylindrical member between said supporting members, said rotor member having motor rotor elements and an impeller for delivering fluid from said openings to said fluid delivery passageway.

2. A motor driven pump comprising housing members and an interior cylindrical sleeve member extending therebetween to provide exteriorly of said sleeve a motor stator chamber, supporting members extending inwardly from opposite ends of said sleeve member, a hollow cylindrical member fixedly carried by said supporting members, said cylindrical member having a longitudinal interior passageway open at one end to provide a fluid inlet, said cylindrical member having a plurality of openings through the wall thereof for fluid delivery, the total area of said openings being substantially equal to the area of said passageway, said sleeve having a fluid delivery passageway therein, and a rotor member mounted on the exterior of said cylindrical member between said supporting members, said rotor member having motor rotor elements and an impeller for delivering fluid from said openings to said fluid delivery passageway.

3. A motor driven pump comprising housing members having an interior sleeve member extending therebetween to provide exteriorly of said sleeve member a motor stator chamber, spaced cup shaped supporting members in engagement with said sleeve extending inwardly from opposite ends of said sleeve member, a cylindrical member fixedly carried by said supporting members, said supporting members having integral flanged portions engaging the exterior of said cylindrical member, fluid inlet and delivery connections extending to said cylindrical member, and a rotor member rotatably mounted on the exterior of said cylindrical member between said supporting members for rotation with respect to said cylindrical member, said rotor member having motor rotor elements and an impeller for delivering fluid from said fluid inlet to said fluid delivery connections.

4. A motor driven pump comprising spaced end frame members having an exterior housing member therebetween and an interior sleeve member extending therebetween, fluid inlet and delivery connections carried by said end frame members, the space between said members providing a motor stator chamber, motor windings in said stator chamber, supporting members extending inwardly from opposite ends of said sleeve member, a hollow cylindrical member fixedly carried by said supporting members, said cylindrical member having a longitudinal interior passageway open at one end through one of said supporting members to provide a fluid inlet in communication with the fluid inlet connection, said cylindrical member having a plurality of openings therethrough at the other end thereof for fluid delivery, the other of said supporting members having fluid delivery passageways therethrough in communication with the fluid delivery connection, and a rotor member mounted on the exterior of said cylindrical member between said supporting members, said rotor member having motor rotor elements in spaced relation to said openings and an impeller for delivering fluid from said openings to said fluid delivery passageways.

5. A motor driven pump comprising spaced end frame members having an exterior housing member therebetween and an interior sleeve member extending therebetween, fluid inlet and delivery connections carried by said end frame members, the space between said members providing a motor stator chamber, motor windings in said stator chamber, spaced cup shaped supporting members extending inwardly from opposite ends of said sleeve member, a hollow cylindrical member fixedly carried by said supporting members, said cylindrical member having a longitudinal interior passageway open at one end through one of said supporting members to provide a fluid inlet in communication with the fluid inlet connection, said cylindrical member having a plurality of openings through the wall thereof spaced from said inlet end for fluid delivery, the total area of said openings being substantially equal to the area of said passageway, the other of said supporting members having fluid delivery passageways therethrough in communication with the fluid delivery connection, and a rotor member mounted on the exterior of said cylindrical member between said supporting members, said rotor member having motor rotor elements in spaced relation to said openings, and an impeller for delivering fluid from said openings to said fluid delivery passageways.

6. A motor driven pump comprising housing members having an interior sleeve extending therebetween to provide exteriorly of said sleeve a motor stator chamber, a supporting member extending inwardly from one end of said sleeve, a fluid outlet connection in communication with the interior of said supporting member, a hollow cylindrical member in fixed engagement with said supporting member, said cylindrical member having fluid delivery openings, a rotor member rotatably mounted on said cylindrical member for rotation with respect to said cylindrical member, said rotor member having a motor rotor and a fluid impeller, said fluid impeller being positioned to receive fluid from said delivery openings, said supporting member having a wall portion disposed transversely in said sleeve member and having passages contiguous to said fluid impeller of increasing size with discharge openings in communication with said fluid outlet connection.

7. A motor driven pump comprising housing members having an interior sleeve extending therebetween to provide exteriorly of said sleeve a motor stator chamber, a supporting member extending inwardly from one end of said sleeve, a fluid outlet connection in communication with the interior of said supporting member, a hollow cylindrical member in fixed engagement with said supporting member, said cylindrical member having fluid delivery openings, a rotor member rotatably mounted on said cylindrical member for rotation with respect to said cylindrical member, said rotor member having a motor rotor and a fluid impeller, said impeller being positioned to receive fluid from said delivery openings, said supporting member having a wall portion disposed transversely in said sleeve and having passages contiguous to said fluid impeller of increasing size with openings disposed in radial planes in communication with said fluid outlet connection.

8. A motor driven pump comprising housing members having an interior sleeve member extending therebetween to provide exteriorly of said sleeve a motor stator chamber, a supporting member extending inwardly from one end of said sleeve, an outlet connection in communication with the interior of said supporting member, a cylindrical member in fixed engagement with said supporting member, a rotor member rotatably mounted on said cylindrical member for rotation with respect to said cylindrical member, said rotor member having a motor rotor and a fluid impeller, said supporting member having a wall portion disposed transversely in said sleeve and having passages contiguous to said fluid impeller of increasing size with openings disposed in radial planes, and a baffle wall on the discharge side of said wall portion transversely disposed with respect to the path of flow from said openings.

9. A motor driven pump comprising housing members having an interior sleeve member extending therebetween to provide exteriorly of said sleeve a motor stator chamber, supporting members extending inwardly from opposite ends of said sleeve member, inlet and outlet connections in communication with the interiors of said supporting members, a cylindrical member carried by said supporting members, a rotor member mounted on said cylindrical member between said supporting members, said rotor member having a motor rotor and a fluid impeller, the supporting member in communication with the outlet connection having a wall portion disposed transversely in said sleeve member and having passages contiguous to said fluid impeller of increasing size with openings disposed in communication with the outlet connection, and a baffle wall on the exterior of said wall portion transversely disposed with respect to the path of flow from said openings.

10. A motor driven pump comprising spaced end frame members having an exterior housing member therebetween and an interior cylindrical sleeve member extending therebetween, fluid inlet and delivery connections carried by said end frame members, the space between said members providing a motor stator chamber and the space within said sleeve member providing a rotor chamber, supporting members having end flanges in engagement with the end frame members and interior portions in engagement with said sleeve member, a central member extending between said supporting members, a rotor member in said rotor chamber and supported by said central member, said rotor member having motor rotor elements and a fluid impeller, a resilient member interposed between said inlet connection and one of said end frame members, a second resilient member interposed between said outlet connection and the other of said end frame members, said resilient members having portions disposed in sealing relation to the junction of the sleeve and the end frame members.

11. A motor driven pump comprising spaced end frame members having an exterior housing member therebetween and an interior sleeve member extending therebetween, fluid inlet and delivery connections carried by said end frame members, the space between said members providing a motor stator chamber and the space within said sleeve member providing a rotor chamber, supporting members having end flanges in engagement with the end frame members and interior portions in engagement with said sleeve member, a central member extending between said supporting members, a rotor member in said rotor chamber and supported by said central member, said rotor member having motor rotor elements and a fluid impeller, a resilient member interposed between said inlet connection and one of said end frame members, a second resilient member interposed between said outlet connection and the other of said end frame members, said resilient members having portions disposed in sealing relation to the junction of the housing member and the end frame members.

12. A motor driven pump comprising spaced end frame members having an exterior housing member therebetween and an interior cylindrical sleeve member extending therebetween, fluid inlet and delivery connections carried by said end frame members, the space between said members providing a motor stator chamber and the space within said sleeve member providing a rotor chamber, supporting members having end flanges in engagement with the end frame members and interior portions in engagement with said sleeve member, a central member extending between said supporting members and having a passageway in communication with said inlet connection and fluid delivery openings communicating with said passageway, a rotor member in said rotor chamber and supported by said central member, said rotor member having motor rotor elements and a fluid impeller, said fluid impeller being positioned to receive fluid from said fluid delivery openings, a resilient member interposed between said inlet connection and one of said end frame members, a second resilient member interposed between said outlet connection and the other of said end frame members, said resilient members having portions disposed in sealing relation to the junction of the supporting members and the end frame members.

13. A motor driven pump comprising spaced end frame members having an exterior housing member therebetween and an interior sleeve member extending therebetween, fluid inlet and delivery connections carried by said end frame members, the space between said members providing a motor stator chamber and the space within said sleeve providing a rotor chamber, supporting members extending inwardly from opposite ends of said sleeve member, a central member fixedly mounted in said supporting members, a rotor member in said rotor chamber and rotatably supported by said central member for rotation of said rotor member with respect to said central member, said rotor member having a fluid impeller on one side thereof, a thrust ring on said central member in spaced relation to the end of the central member and contiguous to said impeller for engagement by said rotor member on the impeller side thereof, said rotor member having motor elements and a fluid impeller, and one of said supporting members having a wall portion for engagement by said rotor member on the opposite side thereof from said thrust ring.

14. A motor driven pump comprising a cylindrical outer sleeve, a cylindrical inner sleeve in spaced relation within said outer sleeve, end plates in engagement with said inner and said outer sleeves, a first bracket at one end of said inner sleeve and extending inwardly therein, a second bracket at the opposite end of said inner sleeve and extending inwardly therein, said second bracket having a plurality of passageways therethrough, a hollow cylindrical member fixedly held in exterior circumferential engagement with said first bracket and positioned within an offset portion of said second bracket and in fixed engagement therewith, said member having the interior thereof in communication with the interior of said first bracket and having a plurality of radially extending openings for fluid delivery, a thrust ring in exterior circumferential engagement with said member contiguous to said openings, a plurality of spaced bearings in exterior circumferential engagement with said support, said bearings having interiorly axially disposed grooves, a motor rotor mounted exteriorly with respect to said bearings and between said brackets, an end plate member mounted on one end of said motor rotor, an impeller secured to said end plate member contiguous to said fluid delivery openings, a motor winding mounted exteriorly with respect to said inner sleeve and interiorly with respect to said outer sleeve, and fluid inlet and outlet connections carried by said end plates.

References Cited in the file of this patent

UNITED STATES PATENTS

| | | |
|---|---|---|
| 2,419,159 | Pezzillo | Apr. 15, 1947 |
| 2,485,408 | Pezzillo | Oct. 18, 1949 |
| 2,535,695 | Pezzillo | Dec. 26, 1950 |
| 2,537,310 | Lapp | Jan. 9, 1951 |

FOREIGN PATENTS

| | | |
|---|---|---|
| 488,444 | Canada | Nov. 25, 1952 |